(12) United States Patent
You et al.

(10) Patent No.: US 12,269,374 B2
(45) Date of Patent: Apr. 8, 2025

(54) VEHICLE REAR SEAT

(71) Applicants: Hyundai Motor Company, Seoul (KR); Kia Corporation, Seoul (KR); Hyundai Transys Inc., Chungcheongnam-do (KR)

(72) Inventors: Jung Sang You, Gyeonggi-do (KR); Yong Chul Kim, Gyeonggi-do (KR); Dae Hee Lee, Incheon (KR); Eun Sue Kim, Gyeonggi-do (KR); Jae Hoon Cho, Gyeonggi-do (KR); Han Kyung Park, Gyeonggi-do (KR); Jae Sung Shin, Gyeonggi-do (KR); Hae Dong Kwak, Gyeonggi-do (KR); Jun Sik Hwang, Gyeonggi-do (KR); Gwon Hwa Bok, Gyeonggi-do (KR)

(73) Assignees: Hyundai Motor Company, Seoul (KR); Kia Corporation, Seoul (KR); Hyundai Transys Inc., Chungcheongnam-do (KR)

( * ) Notice: Subject to any disclaimer, the term of this patent is extended or adjusted under 35 U.S.C. 154(b) by 154 days.

(21) Appl. No.: 18/117,884

(22) Filed: Mar. 6, 2023

(65) Prior Publication Data
US 2024/0067056 A1 Feb. 29, 2024

(30) Foreign Application Priority Data
Aug. 23, 2022 (KR) .................. 10-2022-0105691

(51) Int. Cl.
*B60N 2/30* (2006.01)
*B60N 2/08* (2006.01)
*B60N 2/12* (2006.01)
*B60N 2/20* (2006.01)
*B60N 2/32* (2006.01)
*B60N 2/24* (2006.01)

(52) U.S. Cl.
CPC ............ *B60N 2/0843* (2013.01); *B60N 2/12* (2013.01); *B60N 2/206* (2013.01); *B60N 2/309* (2013.01); *B60N 2/242* (2013.01)

(58) Field of Classification Search
CPC .............................. B60N 2/242; B60N 2/206
USPC ......................................................... 297/248
See application file for complete search history.

(56) References Cited

U.S. PATENT DOCUMENTS

| | | | | |
|---|---|---|---|---|
| 5,529,376 A | * | 6/1996 | Jovan ..................... | B60N 2/015 297/248 |
| 5,769,360 A | * | 6/1998 | Kerbis ................... | B64D 11/06 297/248 X |
| 5,788,324 A | * | 8/1998 | Shea ...................... | B60N 3/101 297/188.04 X |

(Continued)

FOREIGN PATENT DOCUMENTS

KR      2002-0090663 A      12/2002

*Primary Examiner* — Rodney B White
(74) *Attorney, Agent, or Firm* — Fox Rothschild LLP

(57) ABSTRACT

The present disclosure relates to a vehicle rear seat including: a center seat; and side seats located on the left and right of the center seat, wherein, the center seat is capable of protruding by moving the center seat forward with respect to the side seats, and in the state in which the center seat protrudes forward, it is possible to increase an inter-passenger distance so that physical contact between the passenger of the center seat and the passenger of each of the side seats can be prevented as much as possible.

20 Claims, 10 Drawing Sheets

(56) References Cited

U.S. PATENT DOCUMENTS

| | | | | |
|---|---|---|---|---|
| 5,951,084 | A * | 9/1999 | Okazaki | B60N 2/793 |
| | | | | 296/37.16 |
| 6,827,388 | B2 * | 12/2004 | Kayumi | B60N 3/10 |
| | | | | 296/65.13 |
| 7,770,966 | B2 * | 8/2010 | Johnson | B64D 11/0693 |
| | | | | 297/248 X |
| 7,823,950 | B2 * | 11/2010 | Toyota | B60N 2/3038 |
| | | | | 297/248 X |
| 8,215,695 | B2 * | 7/2012 | Ida | B60N 2/01583 |
| | | | | 297/248 X |
| 8,308,238 | B2 * | 11/2012 | Imaoka | B60R 22/26 |
| | | | | 297/248 X |
| 8,678,497 | B2 * | 3/2014 | Kyogoku | B60N 2/206 |
| | | | | 297/248 X |
| 8,833,853 | B2 * | 9/2014 | Kim | B60N 2/2362 |
| | | | | 297/248 X |
| 9,352,676 | B1 * | 5/2016 | Wright | B60N 2/2893 |
| 10,189,378 | B2 * | 1/2019 | Jackson | B60N 2/3097 |
| 2004/0070243 | A1 * | 4/2004 | Cha | B60N 2/3009 |
| | | | | 297/248 X |
| 2007/0158979 | A1 * | 7/2007 | Saberan | B60N 2/3065 |
| | | | | 297/47 |
| 2008/0224511 | A1 * | 9/2008 | Herkenrath | B60N 2/3022 |
| | | | | 297/248 |
| 2009/0121523 | A1 * | 5/2009 | Johnson | B64D 11/0638 |
| | | | | 297/217.3 |
| 2010/0140996 | A1 * | 6/2010 | Winter | B60N 2/3081 |
| | | | | 297/248 |
| 2017/0305306 | A1 * | 10/2017 | Park | B60N 2/065 |

* cited by examiner

VEHICLE REAR SEAT

CROSS-REFERENCE TO RELATED APPLICATION(S)

This application claims under 35 U.S.C. 119 the benefit of Korean Patent Application No. 10-2022-0105691, filed on Aug. 23, 2022, in the Korean Intellectual Property Office, the disclosure of which is herein incorporated by reference in its entirety.

BACKGROUND

Technical Field

The present disclosure relates to a vehicle rear seat, and more particularly, to a technique related to a vehicle rear seat which is usable as a 3-person rear seat and is configured such that a central seat is capable of protruding forward.

Background

A vehicle is provided with seats in which passengers are capable of being seated, and each of the vehicle seats includes a seat cushion configured to support the lower body of a passenger, a seat back configured to support the upper body of the passenger, and a headrest configured to support the head of the passenger.

In a conventional passenger vehicle, a rear seat is provided as a 3-person seat, wherein the 3-person rear seat includes a seat back and a seat cushion which are integrally configured to be used by three persons at the same time.

Therefore, there are problems in that the center seat passenger in the 3-person seat rear seat provides a narrow gap between the left and right passengers, and in that shoulder collisions occur between passengers, making it difficult to sit comfortably.

It should be understood that the foregoing description of the background art is provided merely for the purpose of promoting the understanding of the background of the present disclosure and should not to be accepted as acknowledging that the background art is known to those skilled in the art.

SUMMARY OF THE DISCLOSURE

The present disclosure is to provide a vehicle rear seat which is usable as a 3-person rear seat and has a configuration in which a center seat is movable forward, wherein the center seat is movable forward to protrude if necessary, so that the inter-passenger distance increases to prevent physical contact between the center seat passenger and the side seat passengers as much as possible, thereby inducing a comfortable seating state for the rear seat passengers.

In view of the foregoing, a vehicle rear seat includes: a center seat; side seats located on left and right of the center seat; and a locking mechanism configured to connect a center seat cushion frame of the center seat and a side seat cushion frame assembly of the side seats, wherein, when the locking mechanism is unlocked, the center seat is moved forward and backward with respect to the side seats, and when the center seat moves forward, the center seat protrudes forward with respect to the side seats.

In some embodiments, the side seat cushion frame assembly includes at least two guide pipes, and the locking mechanism is connected to at least one of the at least two guide pipes.

In some embodiments, the center seat may further comprise a center seat back frame, and the side seats may further comprise a side seat back frame, respectively.

In some embodiments, the center seat back frame may be located between the side seat back frames, the center seat cushion frame may be located in a center side portion of the side seat cushion frame assembly.

The locking mechanism includes: a lever bracket fixedly provided to the center seat cushion frame; a locking lever coupled to the lever bracket to be rotatable leftward and rightward about a lever pin; and a locking plate fixedly provided to the side seat cushion frame assembly to face the locking lever, the locking plate being provided with a locking groove such that a lower end of the locking lever is inserted into the locking groove.

The locking mechanism further includes a lever spring having opposite ends coupled respectively to the lever bracket and the locking lever to provide a return force to the locking lever.

The locking groove includes a front locking groove and a rear locking groove, the locking plate is provided with a guide groove extending forward and backward, and the front locking groove and the rear locking groove are connected respectively to opposite ends of the guide groove to extend in a same direction.

When the lower end of the locking lever is inserted into the front locking groove or the rear locking groove, the center seat is in a state of being immovable forward and backward.

When the lower end of the locking lever is pulled out from the front locking groove or the rear locking groove and is located in the guide groove, the locking lever is in a state of being movable along the guide groove so that the center seat is in a state of being movable forward and backward.

When the lower end of the locking lever is inserted into the front locking groove and fixed, the center seat moves forward with respect to the side seats to protrude.

When the lower end of the locking lever is fixed in the rear locking groove, the center seat does not protrude forward with respect to the side seats and is arranged in a same line with the side seats.

The vehicle rear seat may further include: a lever cable connected to the locking lever; and a strap connected to the lever cable and protruding forward from the center seat, the strap being configured to be pulled and operated by a user.

When the user pulls the strap in a state in which the lower end of the locking lever is inserted into the front locking groove or the rear locking groove and the lever cable is pulled, the lower end of the locking lever is pulled out from the front locking groove or the rear locking groove by rotation of the locking lever and located in the guide groove, when the lower end of the locking lever is located guide groove, locking state of the locking lever is released, and when the locking is released, the center seat is in a state of being movable forward and backward with respect to the side seats.

In some embodiments, an end of the strap may protrude from a front side of a cushion part of the center seat.

The side seat cushion frame assembly includes a guide rod fixed thereto to extend forward and backward, and the center seat cushion frame includes a slide bracket fixed thereto and penetrated by the guide rod, the slide bracket being configured to move along the guide rod.

In some embodiments, each of the guide rods may penetrate at least two slide brackets fixed to the center seat cushion frame.

The cushion part and the back part of the center seat are connected via a recliner, so that an angle of the back part is adjustable forward and backward by operating the recliner.

The back part of the center seat is rotated forward and folded when the recliner is operated, and when the back part of the center seat is in the folded state, a passenger of each the side seats uses the folded back part as an armrest.

In some embodiments, operation of the recliner may be possible by manipulating a recliner lever, and the recliner lever protrudes from a front side of the center seat.

The back part is provided with a cup holder, which is exposed upward when the back part is in the folded state.

The vehicle rear seat according to the present disclosure is a seat in which three persons can be seated by using the center seat and the side seats located on the left and right of the center seat. The center seat has a structure that is movable forward with respect to the side seat to protrude, and when the center seat protrudes forward, it is possible to increase the inter-passenger distance. Therefore, there is an advantage in that it is possible to prevent physical contact between the passenger of the center seat and the passengers of the side seats as much as possible, thereby inducing a comfortable seating state of the rear seat passengers.

In addition, in the vehicle rear seat according to the present disclosure, the angle of the back part of the center seat is adjustable in the front-rear direction by the operation of the recliner. Since the back part folded forward is available as an armrest, and the folded back part is provided with the cup holder, there is an advantage in that the passengers of the side seats are able to enjoy a comfortable ride.

As discussed, the method and system suitably include use of a controller or processer.

In another embodiment, vehicles are provided that comprise an apparatus as disclosed herein.

BRIEF DESCRIPTION OF THE DRAWINGS

The above and other embodiments, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
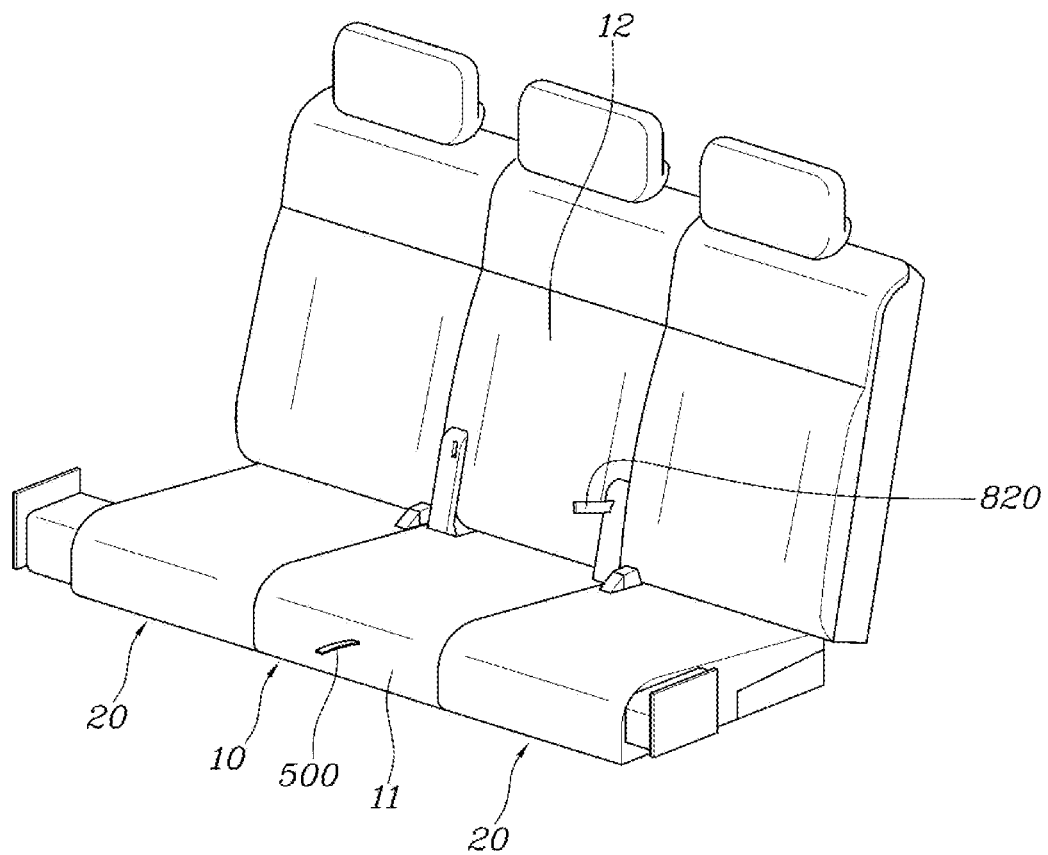
FIG. 1 is a perspective view of a vehicle rear seat according to the present disclosure.
Figure 2:
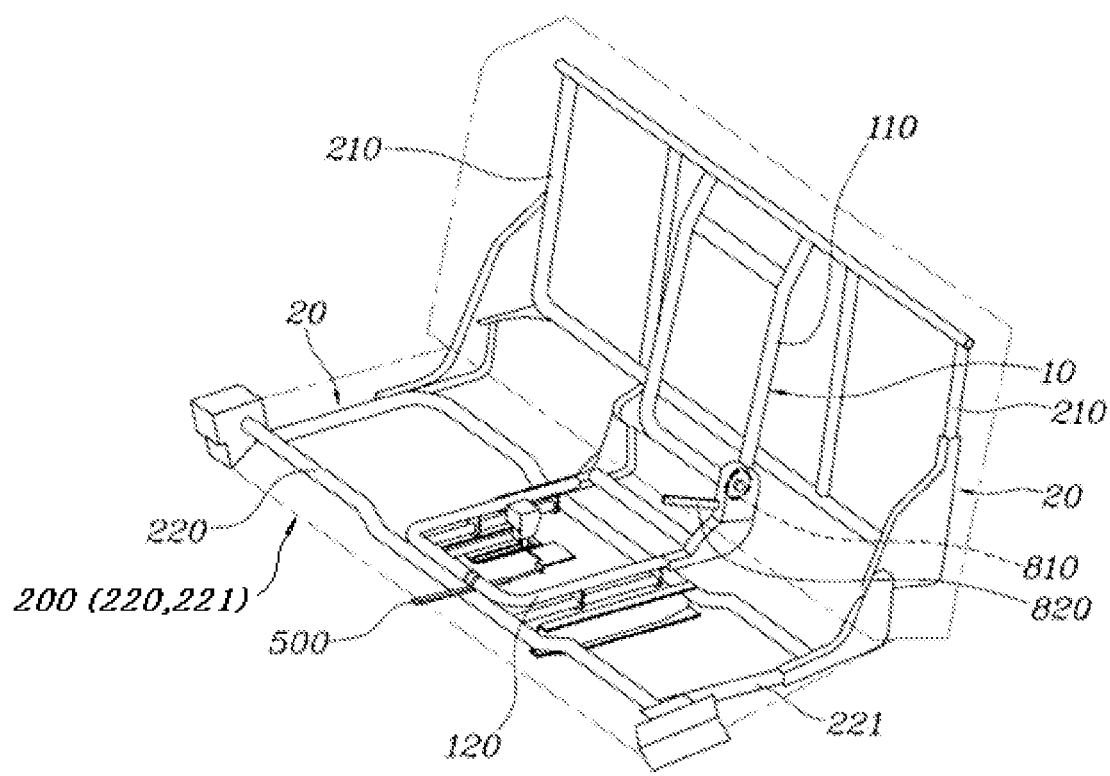
FIG. 2 is a view of the frame structure of FIG. 1.
Figure 3:
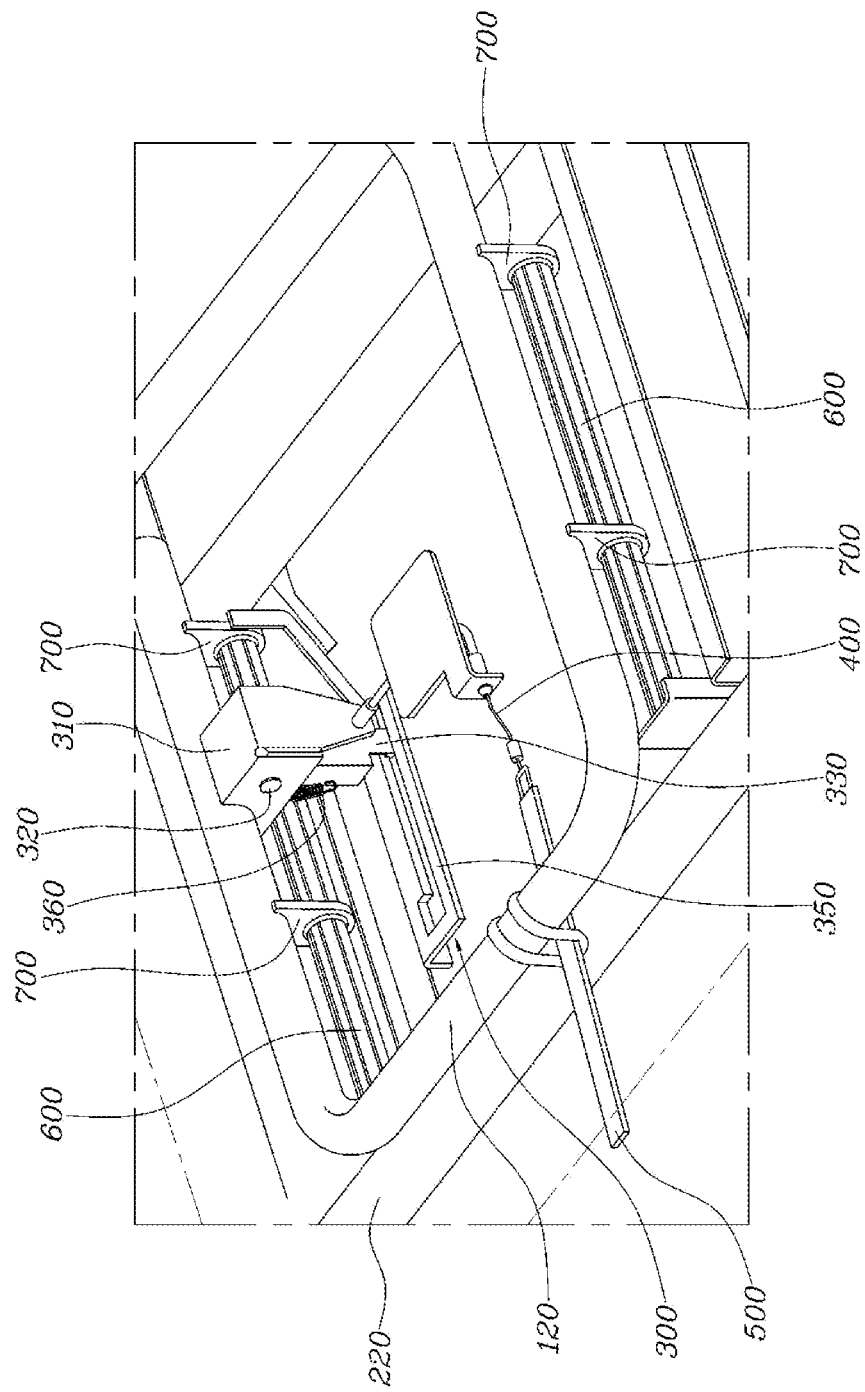
FIGS. 3 to 6 are views illustrating a state in which the locking lever is inserted into the rear locking groove and a state in which the locking lever moves forward along the guide groove in FIG. 2.
Figure 4:
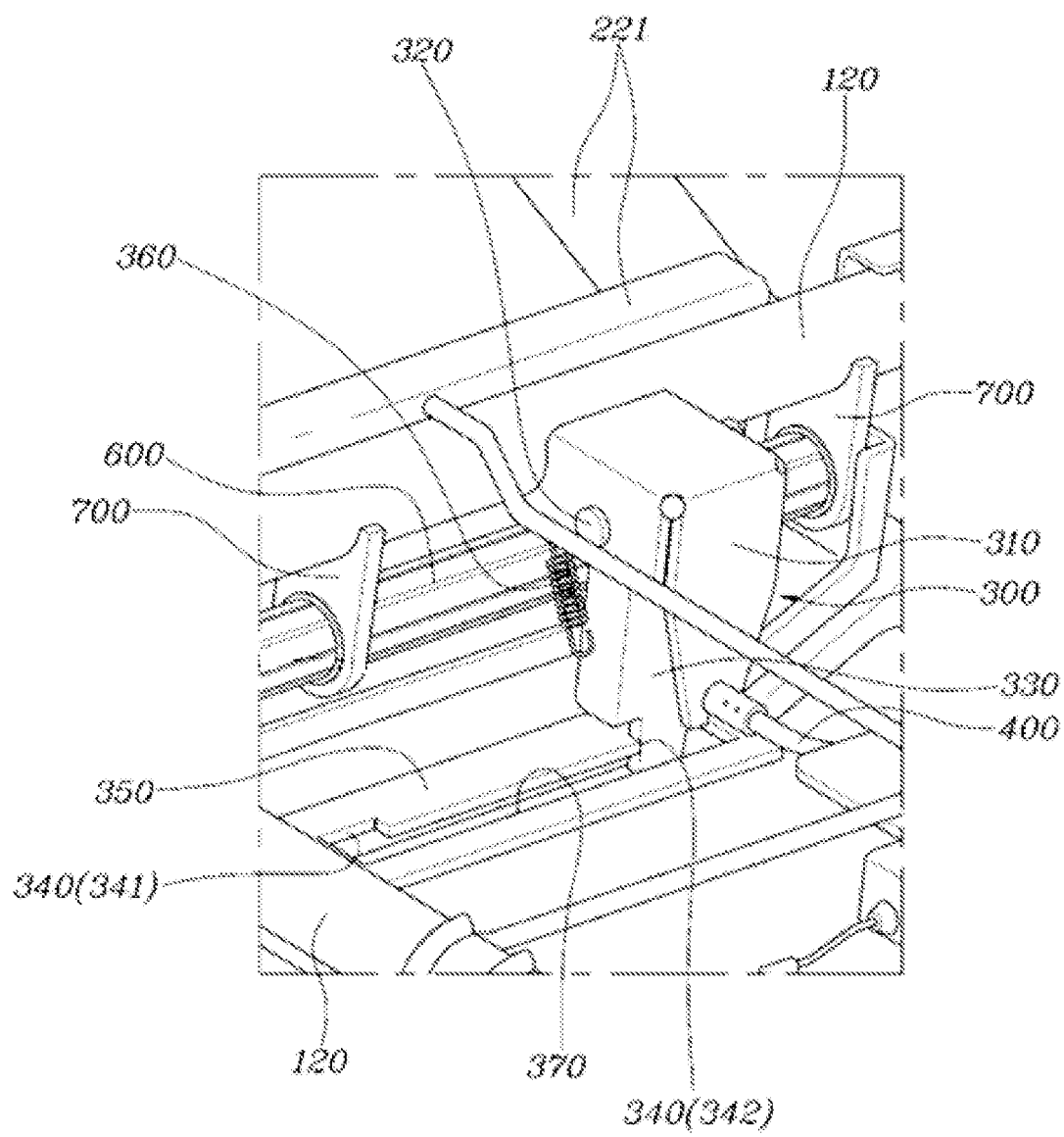

Hereinafter, embodiments disclosed in the present specification will be described in detail with reference to the accompanying drawings, and the same or similar elements are given the same and similar reference numerals, so duplicate descriptions thereof will be omitted.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In describing the embodiments disclosed in the present specification, when the detailed description of the relevant known technology is determined to unnecessarily obscure the gist of the present disclosure, the detailed description may be omitted.

Further, the accompanying drawings are provided only for easy understanding of the embodiments disclosed in the present specification, and the technical spirit disclosed herein is not limited to the accompanying drawings, and it should be understood that all changes, equivalents, or substitutes thereof are included in the spirit and scope of the present disclosure.

Terms including an ordinal number such as "first", "second", or the like may be used to describe various elements, but the elements are not limited to the terms. The above terms are used only for the purpose of distinguishing one element from another element.

In the case where an element is referred to as being "connected" or "coupled" to any other element, it should be understood that another element may be provided therebetween, as well as that the element may be directly connected or coupled to the other element.

In contrast, in the case where an element is "directly connected" or "directly coupled" to any other element, it should be understood that no other element is present therebetween.

A singular expression may include a plural expression unless they are definitely different in a context.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

A unit or a control unit included in names such as a motor control unit (MCU) and a hybrid control unit (HCU) is merely a term widely used for naming a controller configured to control a specific function of a vehicle, but does not mean a generic function unit.

A controller may include a communication device configured to communicate with a sensor or another control unit, a memory configured to store an operation system, a logic command, or input/output information, and at least one processor configured to perform determination, calculation, decision or the like which are required for responsible function controlling.

Hereinafter, a vehicle rear seat according to an embodiment of the present disclosure will be described with reference to the accompanying drawings.

As illustrated in FIGS. 1 to 10, the vehicle rear seat according to the present disclosure may be a 3-person seat including a center seat 10 and side seats 20 located on the left and right of the center seat 10. The center seat 10 is configured separately from the side seats 20 so that the center seat 10 is movable forward and backward with respect to the side seats 20, and when the center seat 10 moves forward, the center seat 10 protrudes forward with respect to the side seats 20.

That is, an embodiment according to the present disclosure relates to a rear seat in which three persons are capable of being seated, wherein the center seat 10 is movable forward from the rear seat to protrude forward with respect to the side seats 20 and the center seat 10 protruding forward is movable backward again to be returned to the initial position thereof. When the center seat 10 is in the state of protruding forward, it is possible to increase the inter-passenger distance so that physical contact between the passenger of the center seat 10 and the passengers of the side seats 20 can be prevented as much as possible, thereby inducing a comfortable seating state of the rear seat passengers.

The center seat 10 may have a configuration in which a center seat back frame 110 and a center seat cushion frame 120 form a framework, and each of the side seats 20 has a configuration in which a side seat back frame 210 and a side seat cushion frame assembly 200 forms a framework. In an embodiment according to the present disclosure, the center seat cushion frame 120 and the side seat cushion frame assembly 200 may be connected via a locking mechanism 300, and the center seat 10 may be configured to be movable forward and backward with respect to the side seats 20 when the locking mechanism 300 is unlocked.

The center seat back frame 110 may be located between the side seat back frames 210, the center seat cushion frame 120 may be located between the side seat cushion frame assembly 200, and the center seat cushion frame 120 and the side seat cushion frame assembly 200 may be connected to each other via a locking mechanism 300.

The locking mechanism 300 may include: a lever bracket 310 fixed to the center seat cushion frame 120; a locking lever 330 coupled to the lever bracket 310 rotatable leftward and rightward about a lever pin 320; and a locking plate 350 fixedly provided to the side seat cushion frame assembly 200 to face the locking lever 330 and having a locking groove 340 formed therein so that the lower end of the locking lever 330 is inserted.

In an embodiment according to the present disclosure, the side seat cushion frame assembly 200 includes at least two guide pipes 220, 221, and the locking mechanism 300 is connected to at least one of the at least two guide pipes 220, 221.

A lever bracket 310 may be coupled to the center seat cushion frame 120 so as to protrude downwardly inside the center seat cushion frame 120, and the upper end of the locking lever 330 may be coupled to the lever bracket 310 to be rotatable leftward and rightward about the lever pin 320.

The locking plate 350 may be fixedly provided to the side seat cushion frame assembly 200 forward and backward so as to extend in the front-rear direction while being located below the locking lever 330, and the lower end of the locking lever 330 may be installed in the form of passing through the locking plate 350.

An embodiment of the present disclosure may further include a lever spring 360 having both ends coupled to the lever bracket 310 and the locking lever 330 to provide a return force to the locking lever 330.

When the user holds and pulls forward a strap 500, which will be described later, a lever cable 400 may be pulled, and the locking lever 330 may be rotated to one side about the lever pin 320 by the pulling of the lever cable 400. When the locking lever 330 is rotated, the lever spring 360 accumulates elastic force while being tensioned, and when the user releases the strap 500 which is being pulled, the shape of the tensioned lever spring 360 is restored, and at this time, a returning force is provided to the locking lever 300 by the accumulated elastic force, so the locking lever 330 is returned to its initial position.

The locking groove 340 formed in the locking plate 350 may include a front locking groove 341 and a rear locking groove 342, and the front locking groove 341 and the rear locking groove 342 may be provided to be spaced apart from each other in the front-rear direction.

In addition, the locking plate 350 may be provided with a guide grooves 370 extending forward and backward, and the front locking groove 341 and the rear locking groove 342 may be connected to opposite ends of the guide groove 370, respectively, to extend in the same direction.

That is, the guide groove 370 may extend in the locking plate 350 forward and backward, and the front and rear locking grooves 341 and 342 may be respectively connected to the front and rear ends of the guide groove 370 to extend in the same direction.

The lower end of the locking lever 330 may be installed to vertically penetrate the guide groove 370 while being movable forward and backward along the guide groove 370, and the lower end of the locking lever 330 may be insertable into the front locking groove 341 at the position of the front end of the guide groove 370 and into the rear locking groove 342 at the position of the rear end of the guide groove 370.

When the lower end of the locking lever 330 is inserted into the front locking groove 341 or into the rear locking groove 342, the locking lever 330 may be in a locked state in which the locking lever 330 is not movable forward and backward. At this time, the center seat 10 is in the locked state in which the center seat 10 is not movable in the front-rear direction with respect to the side seats 20.

When the lower end of the locking lever 330 is pulled out from the front locking groove 341 or from the rear locking groove 342 and is located in the guide groove 370 due to the rotation of the locking lever 330, the locking lever 330 may be in the state of being movable along the guide groove 370. At this time, the center seat 10 is in the unlocked state capable of moving in the front-rear direction with respect to the side seats 20.

Figure 7:
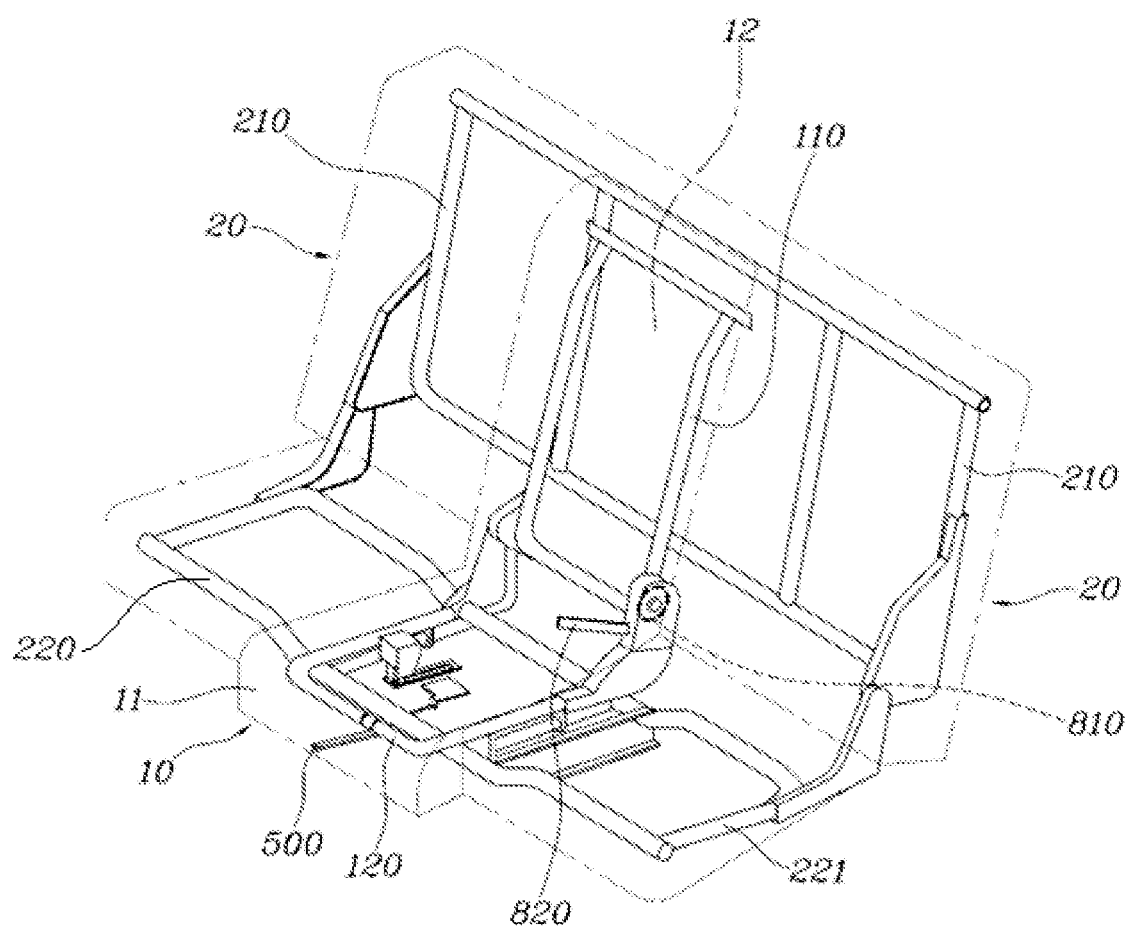
FIG. 7 is a view for explaining the operation in which a center seat moves forward to protrude according to the present disclosure.
Figure 8:
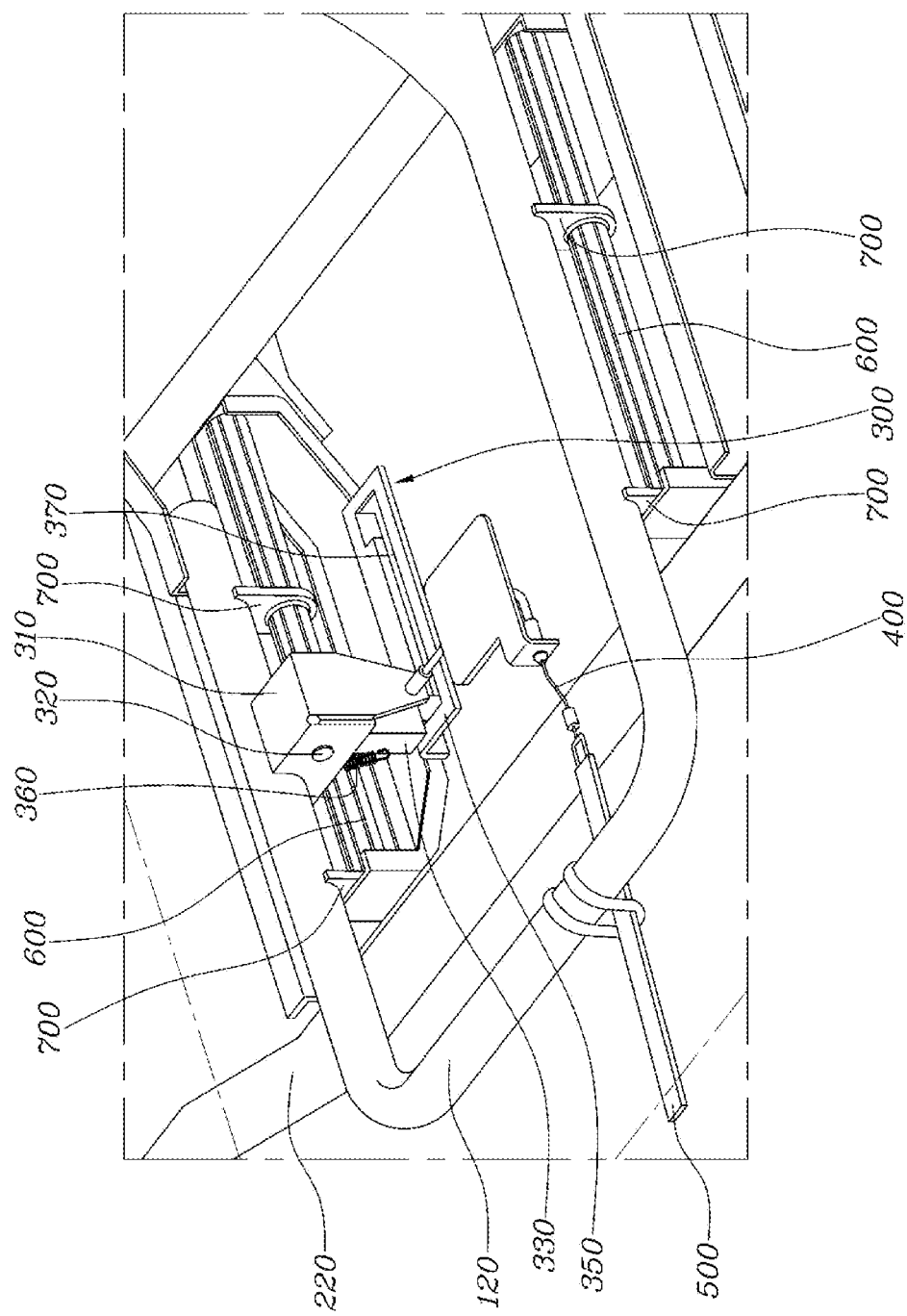
FIGS. 8 and 9 are views illustrating a state in which the locking lever is inserted into the front locking groove in FIG. 7.
Figure 9:
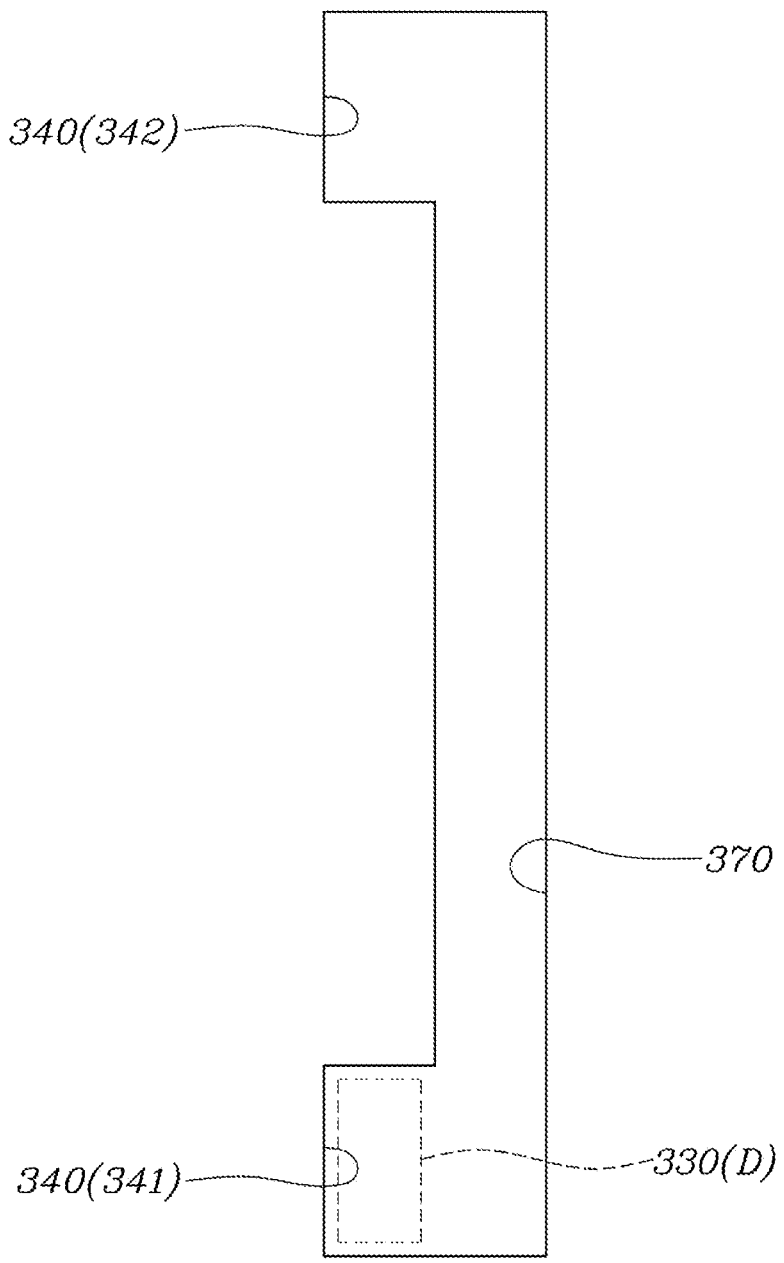

When the lower end of the locking lever 330 is inserted into the front locking groove 341 and fixed, the center seat 10 may move forward with respect to the side seats 20 and become a protruding state (FIGS. 7 to 9).

In addition, when the lower end of the locking lever 330 is inserted into the rear locking groove 342 and fixed, the center seat 10 may not protrude forward with respect to the side seats 20 and may be arranged on the same line as the side seats 20 (the state in FIGS. 1 to 4).

Figure 5:
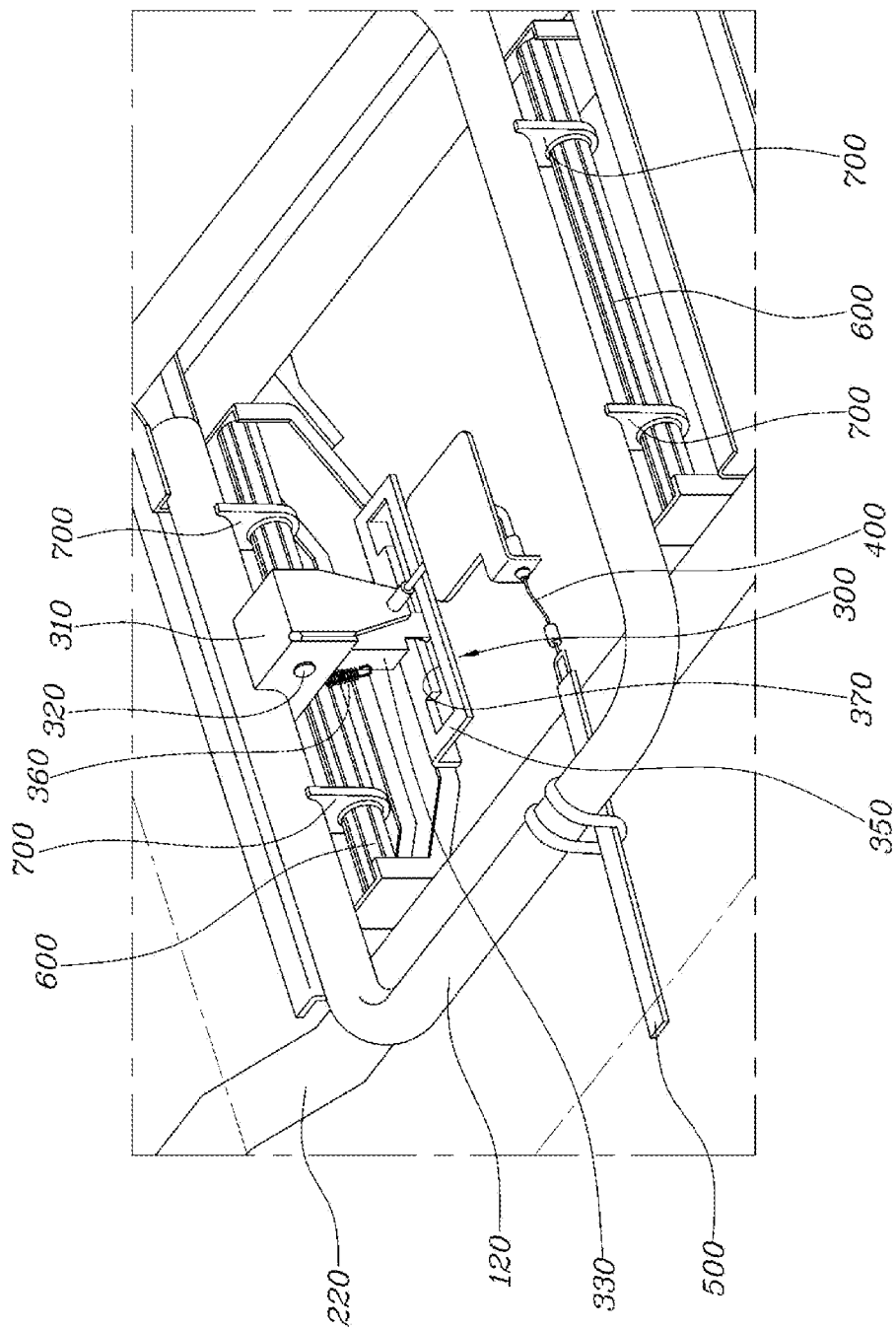

When the lower end of the locking lever 330 is located in the guide groove 370, the lower end of the locking lever 330 may be in a state of being movable forward and backward along the guide groove 370, in which case the center seat 10 enters into a state of being movable forward and backward with respect to the side seats 20 (the state of FIG. 5).

According to the present disclosure, the locking lever 330 may be connected to one end of the lever cable 400, the other end of the lever cable 400 may be connected to the strap 500, and an end of the strap 500 may protrude from the front side of the cushion part 11 of the center seat 10. The user rotates the locking lever 330 via the lever cable 400 by holding and pulling the strap 500 protruding to the front side of the cushion part 11.

When the user pulls the strap 500 in the state in which the lower end of the locking lever 330 is inserted into the front locking groove 341 or the rear locking groove 342, so the lever cable 400 is pulled, the locking lever 330 may rotate to one side about the lever pin 320, the lower end of the locking lever 330 may be pulled out from the front locking groove 341 or the rear locking groove 342 by the rotation of the locking lever 330 and located in the guide groove 370. When the lower end of the locking lever 330 is located in the guide groove 370, the locking state of the locking lever 330 is released, and when the locking is released, the center seat 10 is movable forward and backward with respect to the side seats 20.

According to the present disclosure, guide rods 600 may be fixed to the side seat cushion frame assembly 200 to extend forward and backward, and slide brackets 700, which are penetrated by the guide roads 600, respectively, are fixed to the center seat cushion frame 120 to move along the guide rods 600.

The guide rods 600 and the slide brackets 700 may be parts installed to guide the forward and backward movement of the center seat 10. In order to ensure stable movement of the slide brackets 700, two guide rods 600 are provided and installed on the left and right sides of the side seat cushion frame assembly 200 to extend forward and backward, respectively, and at least two slide brackets 700 may be coupled to each guide rod 600.

Figure 6:
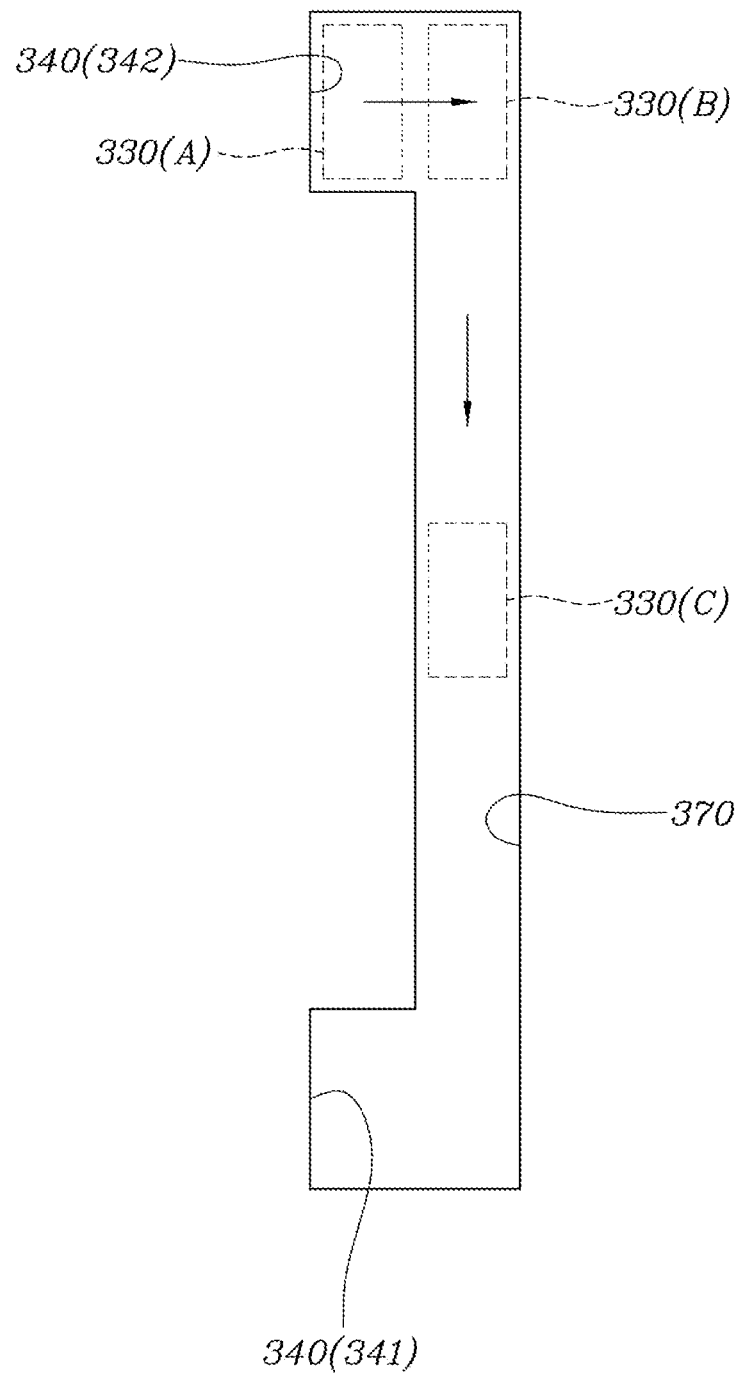

FIGS. 1 to 4 illustrate a state in which the center seat 10 does not protrude forward with respect to the side seats 20 and is arranged on the same line as the side seats 20, in which case the lower end of the locking lever 330 is inserted into the rear locking groove 342 (the state A in FIG. 6).

In the above state, when the user holds and pulls the strap 500 forward, the lever cable 400 may be pulled, and the locking lever 330 may be rotated to one side about the lever pin 320. By the rotation of the locking lever 330, the lower end of the locking lever 330 is pulled out from the rear locking groove 342 and is located in the guide groove 370 (the state B in FIG. 6).

When the lower end of the locking lever 330 is pulled out from the rear locking groove 342 and is located in the guide groove 370, the locking state of the locking lever 330 may be released from this time, and when the lock is released, the lower end of the locking lever 330 may enter into a state of being movable along the guide groove 370, whereby the center seat 10 is in the state of being movable forward with respect to the side seats 20.

The state C in FIGS. 5 and 6 may be a state in which the lower end of the locking lever 330 is located at an intermediate point of the guide groove 370.

When the user holds the strap 500 and pulls the cushion portion 11 of the center seat 10 forward in the state in which the lower end of the locking lever 330 is pulled out from the rear locking groove 342 and is located in the guide groove 370, the lower end of the locking lever 330 may move forward along the guide groove 370 so that the center seat 10 moves to protrude forward with respect to the side seats 20.

FIGS. 7 to 9 illustrate a state in which the forward movement of the center seat 10 is completed.

When the forward movement of the center seat 10 is completed, the lower end of the locking lever 330 may be located at the front end of the guide groove 370, and in this state, when the user releases the strap 500, the locking lever 330 may be rotated in the opposite direction to return to the initial position by the restoring force of the lever spring 360, in which case the lower end of the locking lever 330 is inserted into the front locking groove 341 (the state D in FIG. 9).

When the lower end of the locking lever 330 is inserted into the front locking groove 341 and fixed, the locking state of the locking lever 330 may be maintained. Therefore, the center seat 10 may be maintained in the state of protruding with respect to the side seats 20 and being immovably fixed.

The operation of moving the protruding center seat 10, which has protruded by being moved forward, backward again to be returned to the initial position may be possible by proceeding in the reverse order to that described above, and thus, a description thereof will be omitted.

An embodiment of the present disclosure is characterized in that a recliner 810 may be coupled to a portion in which the cushion part 11 and the back part 12 are connected in the center seat 10. By the operation of the recliner 810, the back part 12 is rotated in a front-rear direction, which makes it possible to adjust the angle of the back part 12 in the front-rear direction. Thus, the passenger of the center seat 10 is able to enjoy a comfortable ride due to the angle-adjustable back part 12.

The operation of the recliner 810 may be possible by manipulating a recliner lever 820, and the recliner lever 820 may protrude from the front side of the center seat 10 so as to allow a passenger to easily manipulate the recliner lever 820.

Figure 10:
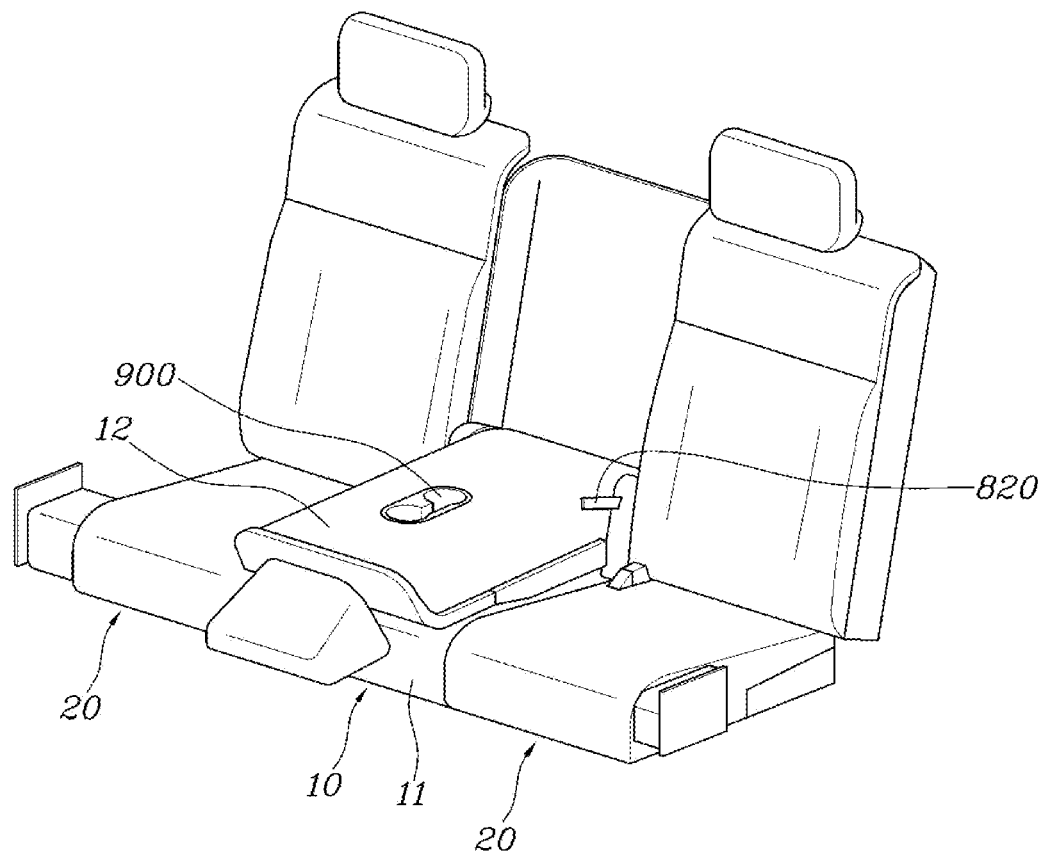
FIG. 10 is a view illustrating a state in which the back part of the center seat is folded forward according to the present disclosure.

In addition, when the recliner 810 is operated, the back part 12 of the center seat 10 may be foldable by being fully rotated forward as illustrated in FIG. 10, and when the back part 12 of the center seat 10 is in the folded state, the passengers of the side seats 20 may use the folded back portion 12 as an armrest, whereby the passengers of the side seats 20 are able to enjoy a comfortable ride.

In addition, since the back part 12 is provided with a cup holder 900, which is exposed upward when the back part 12 of the center seat 10 is in the folded state, the passengers of the side seats 20 may be able to usefully use the cup holder 900.

As described above, the vehicle rear seat according to the present disclosure may be a seat in which three persons can be seated by using the center seat 10 and the side seats 20 located on the left and right of the center seat 10. The center seat 10 has a structure that is movable forward with respect to the side seat 20 to protrude, and when the center seat 10 protrudes forward, it is possible to increase the inter-passenger distance. Therefore, there is an advantage in that it is possible to prevent physical contact between the passenger of the center seat 10 and the passengers of the side seats 20 as much as possible, thereby inducing a comfortable seating state of the rear seat passengers.

In addition, in the vehicle rear seat according to the present disclosure, the angle of the back part 12 of the center seat 10 may be adjustable in the front-rear direction by the operation of the recliner 810. Since the back part 12 folded forward is available as an armrest, and the folded back part 12 is provided with the cup holder 900, there is an advantage in that the passengers of the side seats 20 are able to enjoy a comfortable ride.

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

What is claimed is:

1. A vehicle rear seat comprising:
a center seat;
side seats located on left and right of the center seat; and
a locking mechanism configured to connect a center seat cushion frame of the center seat and a side seat cushion frame assembly of the side seats,
wherein, when the locking mechanism is unlocked, the center seat is capable of moving forward and backward with respect to the side seats,
when the center seat moves forward, the center seat protrudes forward with respect to the side seats; and
wherein the locking mechanism comprise:
a lever bracket fixedly provided to the center seat cushion frame,
a locking lever coupled to the lever bracket to be rotatable leftward and rightward about a lever pin, and
a locking plate fixedly provided to the side seat cushion frame assembly to face the looking lever, the looking plate being provided with a locking groove such that a lower end of the locking lever is inserted into the locking groove.

2. The vehicle rear seat of claim 1, wherein the locking mechanism further comprises a lever spring having opposite ends coupled respectively to the lever bracket and the locking lever to provide a return force to the locking lever.

3. The vehicle rear seat of claim 1, wherein the locking groove comprises a front locking groove and a rear locking groove,
the locking plate is provided with a guide groove extending forward and backward, and
the front locking groove and the rear locking groove are connected respectively to opposite ends of the guide groove to extend in a same direction.

4. The vehicle rear seat of claim 3, wherein, when the lower end of the locking lever is inserted into the front locking groove or the rear locking groove, the center seat is in a state of being immovable in a front-rear direction.

5. The vehicle rear seat of claim 3, wherein, when the lower end of the locking lever is pulled out from the front locking groove or the rear locking groove and is located in the guide groove, the locking lever is in a state of being movable along the guide groove so that the center seat is in a state of being movable forward and backward.

6. The vehicle rear seat of claim 3, wherein, when the lower end of the locking lever is inserted into the front locking groove and fixed, the center seat moves forward with respect to the side seats to protrude.

7. The vehicle rear seat of claim 3, wherein, when the lower end of the locking lever is fixed in the rear locking groove, the center seat does not protrude forward with respect to the side seats and is arranged in a same line with the side seats.

8. The vehicle rear seat of claim 3, further comprising:
a lever cable connected to the locking lever; and
a strap connected to the lever cable and protruding forward from the center seat, the strap being configured to be pulled and operated by a user.

9. The vehicle rear seat of claim 8, wherein, when the user pulls the strap in a state in which the lower end of the locking lever is inserted into the front locking groove or the rear locking groove and the lever cable is pulled, the lower end of the locking lever is pulled out from the front locking groove or the rear locking groove by rotation of the locking lever and located in the guide groove, when the lower end of the locking lever is located guide groove, locking state of the locking lever is released, and when released, the center seat is in a state of being movable forward and backward with respect to the side seats.

10. The vehicle rear seat of claim 8, wherein an end of the strap protrudes from a front side of a cushion part of the center seat.

11. A vehicle rear seat comprising:
a center seat;
side seats located on left and right of the center seat, and
a locking mechanism configured to connect a center seat cushion frame of the center seat and a side seat cushion frame assembly of the side seats,
wherein when the locking mechanism is unlocked, the center seat is capable of moving forward and backward with respective to the side seats,
when the center seat moves forward, the center seat protrudes forward with respect to the side seats;

wherein the side seat cushion frame assembly comprises a guide rod fixed thereto to extend forward and backward, and the center seat cushion frame comprises a slide bracket fixed thereto and penetrated by the guide rod, the slide bracket being configured to move along the guide rod.

12. The vehicle rear seat of claim 11, wherein each of the guide rods penetrates at least two slide brackets fixed to the center seat cushion frame.

13. The vehicle rear seat of claim 1, wherein a cushion part and a back part of the center seat are connected via a recliner, so that an angle of the back part is adjustable forward and backward by operating the recliner.

14. The vehicle rear seat of claim 13, wherein the back part of the center seat is rotated forward and folded when the recliner is operated, and when the back part of the center seat is in the folded state, a passenger of each the side seats uses the folded back part as an armrest.

15. The vehicle rear seat of claim 14, wherein the back part is provided with a cup holder, which is exposed upward when the back part is in the folded state.

16. The vehicle rear seat of claim 13, wherein operation of the recliner is possible by manipulating a recliner lever, and the recliner lever protrudes from a front side of the center seat.

17. The vehicle rear seat of claim 1, wherein the center seat further comprises a center seat back frame, and the side seats further comprise a side seat back frame, respectively.

18. The vehicle rear seat of claim 1, wherein the center seat back frame is located between the side seat back frames, the center seat cushion frame is located in a center side portion of the side seat cushion frame assembly.

19. The vehicle rear seat of claim 1, wherein the side seat cushion frame assembly includes at least two guide pipes, and the locking mechanism is connected to at least one of the at least two guide pipes.

20. A vehicle rear seat comprising:
a center seat;
side seats located on left and right of the center seat; and
a locking mechanism configured to connect a center seat cushion frame of the center seat and a side seat cushion frame assembly of the side seats,
wherein, when the locking mechanism is unlocked, the center seat is capable of moving forward and backward with respect to the side seats,
when the center seat moves forward, the center seat protrudes forward with respect to the side seats;
wherein a cushion part and a back part of the center seat are connected via a recliner, so that an angle of the back part is adjustable forward and backward by operating the recliner; and
wherein operation of the recliner is possible by manipulating a recliner lever, and the recliner lever protrudes from a front side of the center seat.

* * * * *